(12) United States Patent
Endo et al.

(10) Patent No.: US 9,715,168 B2
(45) Date of Patent: Jul. 25, 2017

(54) POLARIZATION CONVERSION ELEMENT AND PROJECTOR

(71) Applicant: SEIKO EPSON CORPORATION, Tokyo (JP)

(72) Inventors: Takashi Endo, Azumino (JP); Masaki Iwamoto, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 95 days.

(21) Appl. No.: 14/728,143

(22) Filed: Jun. 2, 2015

(65) Prior Publication Data

US 2015/0355535 A1 Dec. 10, 2015

(30) Foreign Application Priority Data

Jun. 9, 2014 (JP) .................................. 2014-118784

(51) Int. Cl.
*G03B 21/20* (2006.01)
*G02B 27/28* (2006.01)
(Continued)

(52) U.S. Cl.
CPC ........ *G03B 21/2073* (2013.01); *G02B 27/283* (2013.01); *G02B 27/285* (2013.01);
(Continued)

(58) Field of Classification Search
CPC .. G02B 27/283; G02B 27/285; G02B 27/286; G02B 27/0018; G03B 21/2073; G03B 21/006; H04N 9/3167
See application file for complete search history.

(56) References Cited

U.S. PATENT DOCUMENTS 5,764,412 A * 6/1998 Suzuki ................ G02B 27/285
   349/5
6,373,629 B1   4/2002 Yamagishi et al.
(Continued)

FOREIGN PATENT DOCUMENTS

CN      1251661 A     4/2000
CN    101080658 A    11/2007
(Continued)

OTHER PUBLICATIONS

May 11, 2016 Extended Search Report issued in European Patent Application No. 15171048.0.
(Continued)

*Primary Examiner* — Sultan Chowdhury
*Assistant Examiner* — Magda Cruz
(74) *Attorney, Agent, or Firm* — Oliff PLC

(57) ABSTRACT

An aspect of the polarization conversion element according to the invention is directed to a polarization conversion element including a first optical block including a first polarization separation film, a first reflecting film, a first surface, and a first light incidence surface, and a second optical block including a second polarization separation film, a second reflecting film, a second surface, and a second light incidence surface, wherein the first optical block and the second optical block are bonded to each other so that the first surface and the second surface are opposed to each other, the first polarization separation film is disposed so as to be opposed to the second polarization separation film via the first surface and the second surface, and the first polarization separation film is terminated at a position in the first surface separate from the first light incidence surface.

16 Claims, 8 Drawing Sheets

(51) Int. Cl.
  *G03B 21/00* (2006.01)
  *H04N 9/31* (2006.01)
  *G02B 27/00* (2006.01)

(52) U.S. Cl.
  CPC ........ *G02B 27/286* (2013.01); *G02B 27/0018* (2013.01); *G03B 21/006* (2013.01); *H04N 9/3167* (2013.01)

(56) References Cited

U.S. PATENT DOCUMENTS

| | | |
|---|---|---|
| 2006/0171035 A1 | 8/2006 | Berman et al. |
| 2008/0018996 A1 | 1/2008 | Matsuba et al. |
| 2008/0088799 A1 | 4/2008 | Kawamura |
| 2008/0278690 A1 | 11/2008 | Maeda et al. |
| 2010/0245691 A1 | 9/2010 | Kawamura |
| 2011/0187999 A1* | 8/2011 | Hirata ................ G03B 21/2073 353/20 |
| 2012/0268718 A1* | 10/2012 | Kobayashi ........... G02B 27/285 353/20 |

FOREIGN PATENT DOCUMENTS

| | | |
|---|---|---|
| EP | 0 957 387 A1 | 11/1999 |
| JP | H10-319349 A | 12/1998 |
| JP | 2001-051345 A | 2/2001 |
| JP | 2007-193119 A | 8/2007 |
| JP | 2008-102193 A | 5/2008 |
| JP | 2012-145740 A | 8/2012 |
| WO | 2007/021015 A1 | 2/2007 |

OTHER PUBLICATIONS

Oct. 28, 2015 Partial Search Report issued in European Patent Application No. 15 17 1048.0.

* cited by examiner

POLARIZATION CONVERSION ELEMENT AND PROJECTOR

BACKGROUND

1. Technical Field

The present invention relates to a polarization conversion element and a projector.

2. Related Art

As described in, for example, JP-A-2007-193119, there has been proposed a polarization separation unit provided with polarization separation surfaces disposed so as to be opposed to each other.

In such a polarization separation unit as described above, namely a polarization conversion element, the two polarization separation surfaces (polarization separation films) opposed to each other are designed so as to be in contact with each other in the light incidence surface.

However, in some cases, the polarization separation surfaces opposed to each other have been disposed separately from each other in the light incidence surface due to manufacturing variations. In this case, the light entering an area between the polarization separation surfaces in the light incidence surface fails to enter the polarization separation surface, and thus fails to be subject to the polarization conversion. Therefore, there has been a problem that the polarization conversion efficiency of the polarization separation unit has degraded.

SUMMARY

An advantage of some aspects of the invention is to provide a polarization conversion element capable of inhibiting the polarization conversion efficiency from degrading, and a projector provided with such a polarization conversion element.

A polarization conversion element according to an aspect of the invention is a polarization conversion element including a first optical block including a first polarization separation film, a first reflecting film, a first surface, and a first light incidence surface, and a second optical block including a second polarization separation film, a second reflecting film, a second surface, and a second light incidence surface, wherein the first optical block and the second optical block are bonded to each other so that the first surface and the second surface are opposed to each other, the first polarization separation film is disposed so as to be opposed to the second polarization separation film via the first surface and the second surface, and the first polarization separation film is terminated at a position in the first surface separate from the first light incidence surface.

According to the polarization conversion element of the aspect of the invention, since the first polarization separation film is terminated at the position in the first surface separate from the first light incidence surface, even in the case in which the manufacturing variations has occurred, the first polarization separation film is inhibited from being terminated at the position in the first light incidence surface separate from the first surface. Thus, it is inhibited that the gap is generated between the first polarization separation film and the first surface when viewed from a direction parallel to the incident direction of the light. Therefore, according to the polarization conversion element of the aspect of the invention, the amount of the light failing to enter the first polarization separation film can be reduced, and as a result, the polarization conversion efficiency can be inhibited from degrading.

The second polarization separation film may be terminated at a position in the second surface separate from the second light incidence surface.

According to this configuration, also in the second optical block, the second polarization separation film is inhibited from being terminated at the position in the second light incidence surface separate from the second surface. Thus, it is inhibited that the gap is generated between the second polarization separation film and the second surface when viewed from a direction parallel to the incident direction of the light. Therefore, the amount of light failing to enter the second polarization separation film can be reduced, and the polarization conversion efficiency can further be inhibited from degrading.

The first polarization separation film and the second polarization separation film may be connected to each other.

According to this configuration, since the amount of light passing through the gap between the first polarization separation film and the second polarization separation film can be reduced, the polarization conversion efficiency can further be inhibited from degrading.

A reflecting element may be disposed between the first surface and the second surface.

According to this configuration, even in the case in which the distance between the position at which the first polarization separation film is terminated and the first light incidence surface is different from the distance between the position at which the second polarization separation film is terminated and the second light incidence surface, it is possible to inhibit the light from being transmitted through the gap between the first polarization separation film and the second polarization separation film.

The first optical block may include a third polarization separation film and a third reflecting film, the first reflecting film may be terminated on the first light incidence surface, the third polarization separation film and the third reflecting film may be terminated on the first light incidence surface, and a distance between a position in the first light incidence surface, at which the first reflecting film is terminated, and the first surface may be shorter than a distance between a position in the first light incidence surface, at which the third polarization separation film is terminated, and a position in the first light incidence surface, at which the third reflecting film is terminated.

According to this configuration, it is possible to design the distance between the first polarization separation film and the first reflecting film and the distance between the third polarization separation film and the third reflecting film so as to be equal to each other. Thus, in the case of using a manufacturing method of obliquely cutting the laminated body having substrates made of, for example, glass stacked on each other, the thicknesses of the plurality of substrates can be made equal to each other. Therefore, according to this configuration, the manufacturing cost can be reduced.

The second optical block may include a fourth polarization separation film and a fourth reflecting film, the second reflecting film may be terminated on the second light incidence surface, the fourth polarization separation film and the fourth reflecting film may be terminated on the second light incidence surface, and a distance between a position in the second light incidence surface, at which the second reflecting film is terminated, and the second surface may be shorter than a distance between a position in the second light incidence surface, at which the fourth polarization separation film is terminated, and a position in the second light incidence surface, at which the fourth reflecting film is terminated.

According to this configuration, the manufacturing cost can further be reduced.

The first optical block may include a third polarization separation film and a third reflecting film, the first polarization separation film and the first reflecting film may be disposed in parallel to each other, the third polarization separation film and the third reflecting film may be disposed in parallel to each other, and a distance between the first polarization separation film and the first reflecting film may be longer than a distance between the third polarization separation film and the third reflecting film.

According to this configuration, while keeping the distance between the position in the first light incidence surface at which the first reflecting film is terminated and the first surface equal to the distance between the position in the first light incidence surface at which the third polarization separation film is terminated and the position in the first light incidence surface at which the third reflecting film is terminated, the gap can be inhibited from being generated between the first polarization separation film and the first surface when viewed in a direction parallel to the incident direction of the light.

The second optical block may include a fourth polarization separation film and a fourth reflecting film, the second polarization separation film and the second reflecting film may be disposed in parallel to each other, the fourth polarization separation film and the fourth reflecting film may be disposed in parallel to each other, and a distance between the second polarization separation film and the second reflecting film may be longer than a distance between the fourth polarization separation film and the fourth reflecting film.

According to this configuration, it is inhibited that the gap is generated between the second polarization separation film and the second surface when viewed from a direction parallel to the incident direction of the light.

A projector according to an aspect of the invention includes one of the polarization conversion elements described above, a light source, a lens adapted to guide light emitted from the light source to the polarization conversion element, a light modulation element adapted to modulate light emitted from the polarization conversion element, and a projection optical system adapted to project light modulated by the light modulation element.

According to the projector of the aspect of the invention, since one of the polarization conversion elements described above is provided, it is possible to inhibit the light efficiency from degrading.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
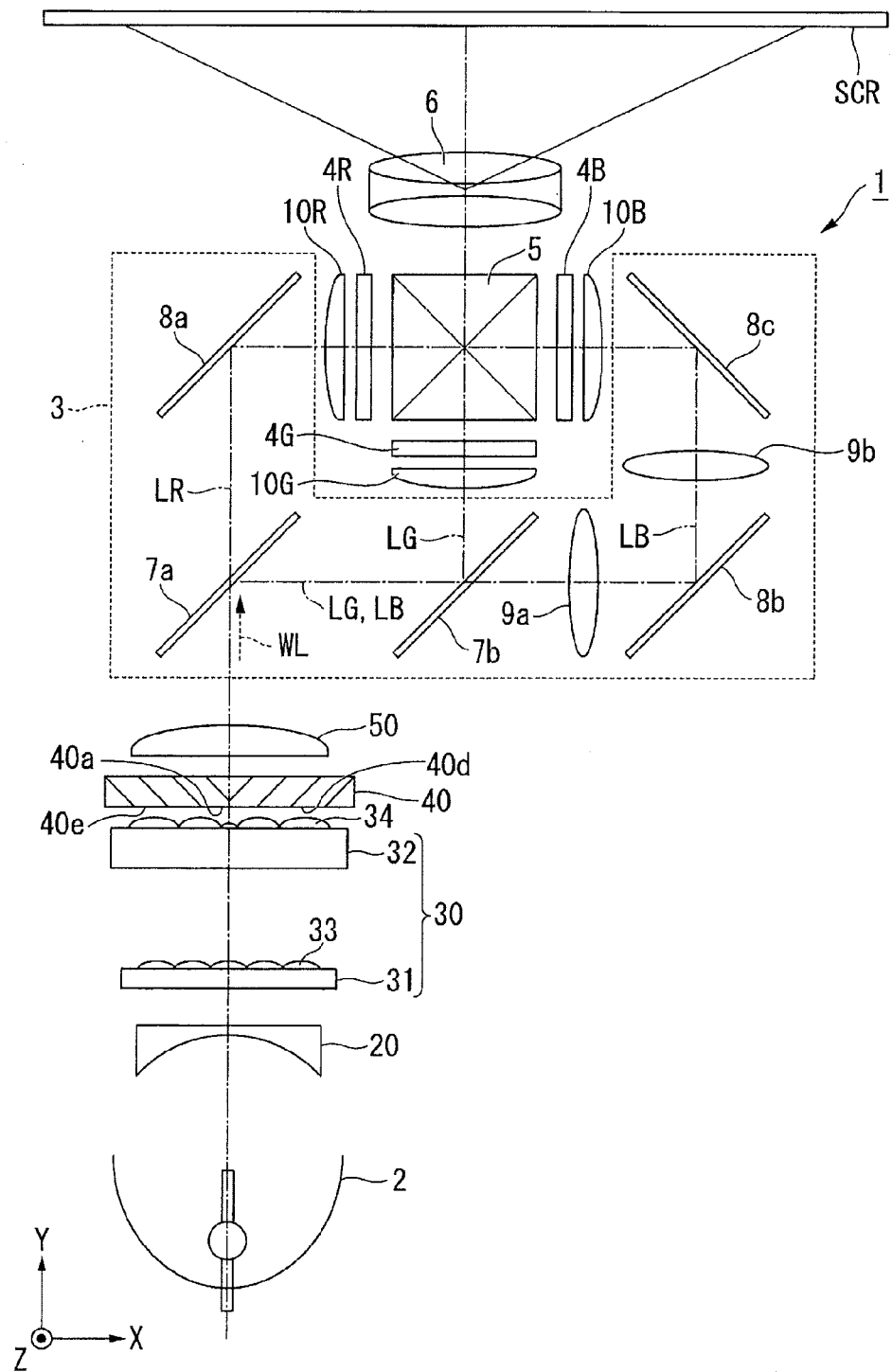
FIG. 1 is a schematic diagram showing a projector according to a first embodiment of the invention.

Hereinafter, projectors according to some embodiments of the invention will be explained with reference to the accompanying drawings.

It should be noted that the scope of the invention is not limited to the embodiments hereinafter described, but can arbitrarily be modified within the technical idea or the technical concept of the invention. Further, in the drawings hereinafter explained, the actual structures and the structures of the drawings are made different from each other in scale size, number, and so on in order to make each constituent easy to understand.

Figure 2:
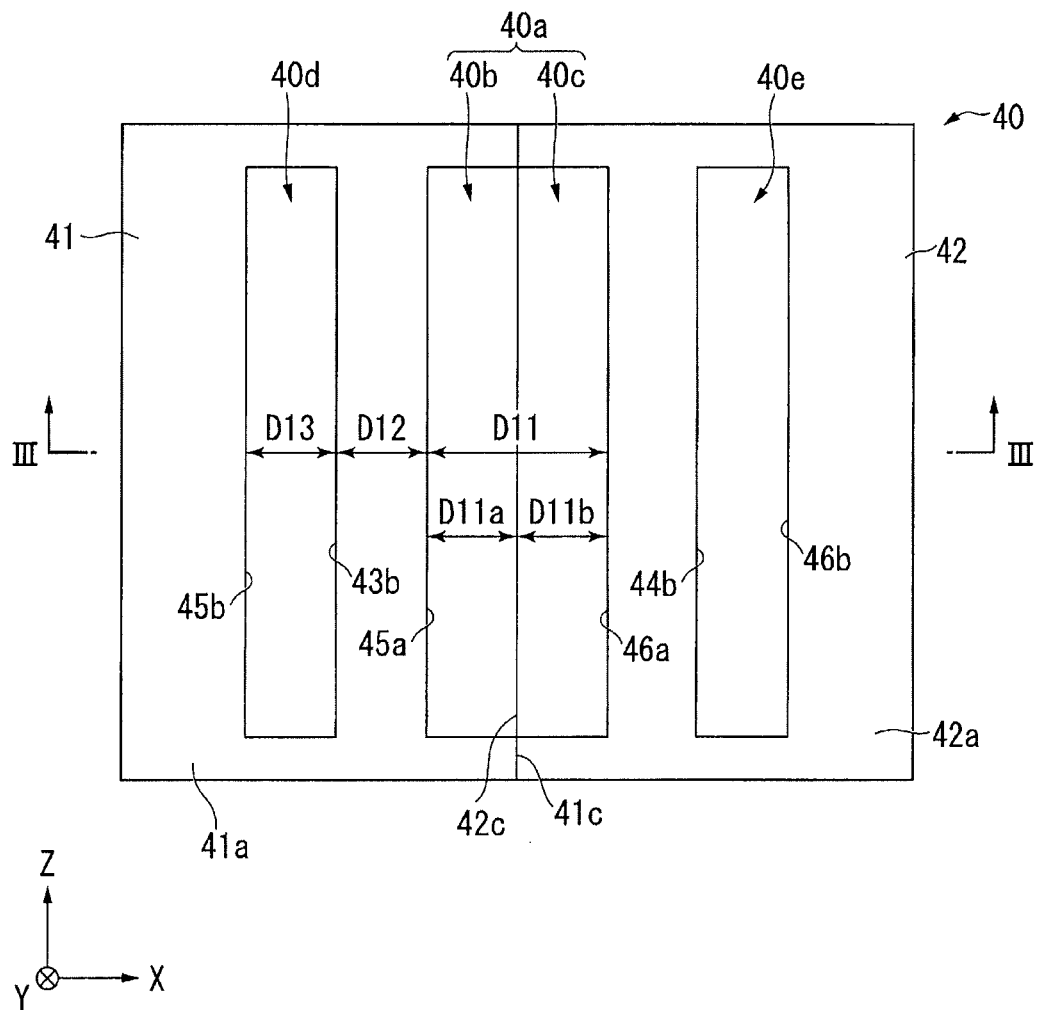
FIG. 2 is a front view showing a polarization conversion element according to the first embodiment.
Figure 3:
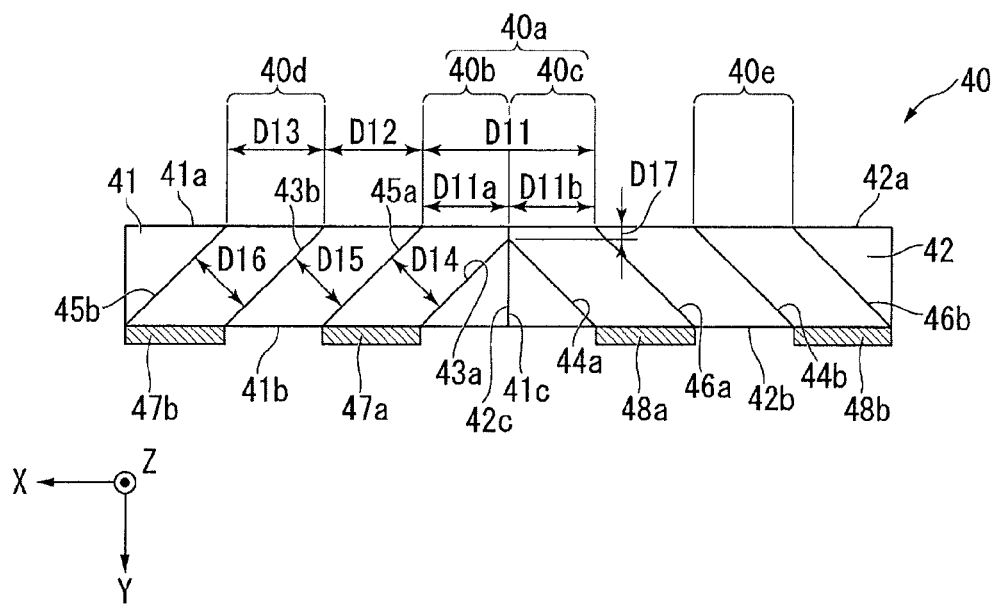
FIG. 3 is a diagram showing the polarization conversion element according to the first embodiment, and is a III-III cross-sectional view in FIG. 2.

Further, in the drawings, an XYZ coordinate system is arbitrarily shown as a three-dimensional orthogonal coordinate system, the Z-axis direction is defined as the height direction of a polarization conversion element 40 shown in FIGS. 2 and 3, namely a vertical direction in FIG. 2, the Y-axis direction is defined as the thickness direction of the polarization conversion element 40, namely a vertical direction in FIG. 3, and the X-axis direction is defined as the width direction of the polarization conversion element 40, namely a horizontal direction in FIG. 2.

First Embodiment

FIG. 1 is a schematic diagram showing the projector 1 according to the present embodiment.

As shown in FIG. 1, the projector 1 is schematically provided with a light source 2, a concave lens 20, an integrator optical system 30, a polarization conversion element 40, an overlapping optical system 50, a color separation optical system 3, a light modulation device 4R, a light modulation device 4G, a light modulation device 4B, a combining optical system 5, and a projection optical system 6.

The light source 2 emits illumination light WL toward the concave lens 20. The configuration of the light source 2 is not particularly limited, and in the present embodiment, the light source 2 is provided with a lamp such as a super-high pressure mercury lamp, a metal halide lamp, or a xenon lamp, and a reflector for reflecting the light of the lamp.

The illumination light WL having been emitted from the light source 2 enters the integrator optical system 30 via the concave lens 20.

The integrator optical system 30 is for homogenizing the illuminance distribution in the illumination target area in cooperation with the overlapping optical system 50. The integrator optical system 30 is provided with a first lens array 31, and a second lens array 32. Due to the first lens array 31 and the second lens array 32, the illumination light WL from the light source 2 is guided to the polarization conversion element 40. As shown in FIG. 2, the polarization conversion element 40 is provided with a central light entrance area 40a, a light entrance area 40d, and a light entrance area 40e. A configuration of the polarization conversion element 40 will be described in detail in the latter part.

The first lens array 31 is provided with an odd number of lens columns each formed of a plurality of lenses 33. In the present embodiment, the number of lens columns in the width direction (X-axis direction) is odd. In FIG. 1, five lens columns are arranged in the width direction. The width and the thickness are uniform throughout the lenses 33. The optical axes of the lenses 33 in the central lens column pass through the bonding interface between a first optical block 41 and a second optical block 42 of the polarization conversion element 40 described later. The lenses 33 each correspond to a lens in the appended claims.

The second lens array 32 is provided with an odd number of lens columns each formed of a plurality of lenses 34. In the second lens array 32, there are also arranged five lens columns in the width direction in accordance with the number of plural lens columns provided to the first lens array 31. In the present embodiment, the width of the lens 34 is adjusted so as to make the light having been emitted from the first lens array 31 enter the corresponding light entrance area of the polarization conversion element 40.

In the present embodiment, the lenses 34 in the second lens array 32 are designed so that the light from the lenses 34 in the three lens columns located in the central portion of the second lens array 32 enters the central light entrance area 40a, the light from the lenses 34 in the lens column located in one end of the second lens array 32 enters the light entrance area 40d, and the light from the lenses 34 in the lens column in the other end enters the light entrance area 40e. For example, in the example shown in FIG. 1, the widths of the lenses 34 increase along an outward direction from the center.

The illumination light WL having passed through the integrator optical system 30 enters the polarization conversion element 40 through the central light entrance area 40a, the light entrance area 40d, and the light entrance area 40e. The polarization conversion element 40 is for uniforming the polarization direction of the illumination light WL.

The illumination light WL, which has passed through the polarization conversion element 40 to thereby be uniformed in the polarization direction, is formed of a plurality of light beams. The plurality of light beams enters the overlapping optical system 50. The overlapping optical system 50 overlaps the light beams, which have been emitted from the polarization conversion element 40, each other in the illumination target area. The overlapping optical system 50 is formed of, for example, a convex lens. The illuminance distribution in the illumination target area is homogenized by the integrator optical system 30 and the overlapping optical system 50. The illumination light WL having been emitted from the overlapping optical system 50 enters the color separation optical system 3.

The color separation optical system 3 is for separating the illumination light WL having a white color into a red light beam LR, a green light beam LG, and a blue light beam LB. The color separation optical system 3 is schematically provided with a first dichroic mirror 7a and a second dichroic mirror 7b, a first reflecting mirror 8a, a second reflecting mirror 8b, and a third reflecting mirror 8c, and a first relay lens 9a and a second relay lens 9b.

The first dichroic mirror 7a has a function of separating the illumination light WL from the light source 2 into the red light beam LR and the other light beams (the green light beam LG and the blue light beam LB). The first dichroic mirror 7a transmits the red light beam LR thus separated from, and at the same time reflects the other light beams (the green light beam LG and the blue light beam LB). Meanwhile, the second dichroic mirror 7b has a function of separating the other light beams into the green light beam LG and the blue light beam LB. The second dichroic mirror 7b reflects the green light beam LG thus separated from, while transmitting the blue light beam LB.

The first reflecting mirror 8a is disposed in the light path of the red light beam LR to reflect the red light beam LR, which has been transmitted through the first dichroic mirror 7a, toward the light modulation device 4R. Meanwhile, the second reflecting mirror 8b and the third reflecting mirror 8c are disposed in the light path of the blue light beam LB to guide the blue light beam LB, which has been transmitted through the second dichroic mirror 7b, to the light modulation device 4B.

It should be noted that the green light beam LG is reflected by the second dichroic mirror 7b toward the light modulation device 4G.

The first relay lens 9a and the second relay lens 9b are disposed on the light emission side of the second dichroic mirror 7b in the light path of the blue light beam LB. The first relay lens 9a and the second relay lens 9b have a function of compensating the optical loss of the blue light beam LB due to the fact that the optical path length of the blue light beam LB becomes longer than the optical path lengths of the red light beam LR and the green light beam LG.

The light modulation device 4R modulates the red light beam LR in accordance with image information to form an image light beam corresponding to the red light beam LR while transmitting the red light beam LR. The light modulation device 4G modulates the green light beam LG in accordance with the image information to form an image light beam corresponding to the green light beam LG while transmitting the green light beam LG. The light modulation device 4B modulates the blue light beam LB in accordance with the image information to form an image light beam corresponding to the blue light beam LB while transmitting the blue light beam LB.

As the light modulation devices 4R, 4G, and 4B, there are used, for example, transmissive liquid crystal panels. Further, in the entrance side and the exit side of each of the liquid crystal panels, there are respectively disposed a pair of polarization plates (not shown).

On the entrance side of the light modulation devices 4R, 4G, and 4B, there are respectively disposed field lenses 10R, 10G, and 10B. The field lenses 10R, 10G, and 10B are for collimating the red light beam LR, the green light beam LG, and the blue light beam LB entering the light modulation devices 4R, 4G, and 4B, respectively.

The combining optical system 5 combines the image light beams corresponding to the red light beam LR, the green light beam LG, and the blue light beam LB having been input from the light modulation devices 4R, 4G, and 4B, respectively, and then emits the image light beam obtained by the combination toward the projection optical system 6. As the combining optical system 5, there is used, for example, a cross dichroic prism.

The projection optical system 6 is formed of a projection lens group. The projection optical system 6 projects the image light beam combined by the combining optical system 5 toward the screen SCR in an enlarged manner. Thus, a color picture thus enlarged is displayed on the screen SCR.

Then, the polarization conversion element 40 will be explained in detail.

FIG. 2 is a front view showing the polarization conversion element 40. FIG. 3 is a cross-sectional view in FIG. 2.

As shown in FIGS. 2 and 3, the polarization conversion element 40 is provided with a first optical block 41, a second optical block 42, and wave plates 47a, 47b, 48a, and 48b. The first optical block 41 and the second optical block 42 are bonded to each other so that a first bonding surface 41c of the first optical block 41 described later and a second bonding surface 42c of the second optical block 42 described later are opposed to each other.

It should be noted that in the following explanation, the bonding interface side between the first optical block 41 and the second optical block 42 is referred to as center side, and the opposite side to the bonding interface is referred to as outside, in some cases.

First Optical Block

In the present embodiment, the first optical block 41 has a rectangular solid shape. The first optical block 41 is formed of, for example, glass.

The first optical block 41 is provided with a first light incidence surface 41a, a first light exit surface 41b, a first bonding surface 41c, at least one polarization separation film, and at least one reflecting film. The reflecting film is not particularly limited as long as the reflecting film is a member capable of reflecting the light input from the polarization separation film, and a metal film, a dielectric multilayer film, and so on can be used.

In the present embodiment, the first optical block 41 includes a center side polarization separation film 43a, an outside polarization separation film 43b, a center side reflecting film 45a, and an outside reflecting film 45b. The center side polarization separation film 43a, the outside polarization separation film 43b, the center side reflecting film 45a, and the outside reflecting film 45b are each a member having a belt-like shape extending in the Z-axis direction, and are disposed inside the first optical block 41. Hereinafter, the explanation will be presented mainly using X-Y cross-sectional views.

The first bonding surface 41c corresponds to a first surface in the appended claims. The center side polarization separation film 43a corresponds to a first polarization separation film in the appended claims. The outside polarization separation film 43b corresponds to a third polarization separation film in the appended claims. The center side reflecting film 45a corresponds to a first reflecting film in the appended claims. The outside reflecting film 45b corresponds to a third reflecting film in the appended claims.

The first light incidence surface 41a is a surface of the first optical block 41 located on the side (−Y side) to which the light is input.

The first light exit surface 41b is a surface opposed to the first light incidence surface 41a, and is a surface of the first optical block 41 located on the side (+Y side) from which the light is emitted.

The first bonding surface 41c is a surface on the side (−X side) opposed to the second bonding surface 42c of the second optical block 42 described later, and bonded to the second optical block 42. In the present embodiment, the first bonding surface 41c is perpendicular to the first light incidence surface 41a and the first light exit surface 41b.

As shown in FIG. 3, the center side polarization separation film 43a is disposed so as to be opposed to a center side polarization separation film 44a of the second optical block 42 described later via the first bonding surface 41c and a second bonding surface 42c described later. The center side polarization separation film 43a is disposed so as to be tilted 45° with respect to the first light incidence surface 41a. One end of the center side polarization separation film 43a is connected to the first light exit surface 41b. The other end of the center side polarization separation film 43a is connected to the first bonding surface 41c. The position at which the center side polarization separation film 43a is connected to the first bonding surface 41c is a position apart from the first light incidence surface 41a by a distance D17. In other words, the center side polarization separation film 43a is terminated at the position in the first bonding surface 41c separate from the first light incidence surface 41a.

The center side polarization separation film 43a transmits the light with a predetermined polarization direction, and at the same time reflects the light with a different polarization direction different from the predetermined polarization direction. In the present embodiment, for example, the center side polarization separation film 43a transmits S-polarized light, and reflects P-polarized light. The center side polarization separation film 43a is formed of, for example, a dielectric multilayer film.

In the present embodiment, the outside polarization separation film 43b is disposed in parallel to the center side polarization separation film 43a. In other words, the outside polarization separation film 43b is disposed so as to be tilted 45° with respect to the first light incidence surface 41a. One end of the outside polarization separation film 43b is connected to the first light exit surface 41b. The other end of the outside polarization separation film 43b is connected to the first light incidence surface 41a. In other words, the outside polarization separation film 43b is terminated in the first light incidence surface 41a. The outside polarization separation film 43b is disposed on an opposite side (+X side) of the center side polarization separation film 43a to the first bonding surface 41c. The outside polarization separation film 43b has substantially the same optical characteristics as those of the center side polarization separation film 43a.

It should be noted that in the present specification, a parallel state includes not only the case in which members are strictly parallel to each other, but also the case in which the members are slightly nonparallel to each other within design tolerance. Specifically, there is included the range in which, for example, the range in which a difference in tilt of the polarization separation film and the reflecting film from the first light incidence surface 41a is within 1°.

The center side reflecting film 45a is disposed between the center side polarization separation film 43a and the outside polarization separation film 43b. The center side reflecting film 45a is disposed in parallel to the center side polarization separation film 43a, namely so as to be tilted 45° with respect to the first light incidence surface 41a. One end of the center side reflecting film 45a is connected to the first light exit surface 41b. The other end of the center side reflecting film 45a is connected to the first light incidence surface 41a. In other words, the center side reflecting film 45a is terminated in the first light incidence surface 41a. The center side reflecting film 45a is formed of, for example, metal high in light reflectance such as silver (Ag) or aluminum (Al).

The outside reflecting film 45b is disposed on an opposite side (+X side) of the outside polarization separation film 43b to the center side reflecting film 45a. The outside reflecting film 45b is disposed in parallel to the outside polarization separation film 43b, namely so as to be tilted 45° with respect to the first light incidence surface 41a. One end of the outside reflecting film 45b is connected to the first light exit surface 41b. The other end of the outside reflecting film 45b is connected to the first light incidence surface 41a. In other words, the outside reflecting film 45b is terminated in the first light incidence surface 41a. The outside reflecting film 45b is formed of, for example, metal similar to the center side reflecting film 45a.

When viewed along the Y-axis direction, the position in the first light exit surface 41b, to which the center side polarization separation film 43a is connected, overlaps the position in the first light incidence surface 41a, to which the center side reflecting film 45a is connected. When viewed along the Y-axis direction, the position in the first light exit surface 41b, to which the center side reflecting film 45a is connected, overlaps the position in the first light incidence surface 41a, to which the outside polarization separation film 43b is connected. When viewed along the Y-axis direction, the position in the first light exit surface 41b, to which the outside polarization separation film 43b is connected, overlaps the position in the first light incidence surface 41a, to which the outside reflecting film 45b is connected.

As shown in FIGS. 2 and 3, between the first bonding surface 41c and the center side reflecting film 45a in the first light incidence surface 41a, there is formed a first central light entrance area 40b. Between the outside polarization separation film 43b and the outside reflecting film 45b in the first light incidence surface 41a, there is formed a light entrance area 40d.

In the present embodiment, the width D11a of the first central light entrance area 40b is smaller than the width D13 of the light entrance area 40d. In other words, the distance between the position in the first light incidence surface 41a, at which the center side reflecting film 45a is terminated, and the first bonding surface 41c is shorter than the distance between the position in the first light incidence surface 41a, at which the outside polarization separation film 43b is terminated, and the position in the first light incidence surface 41a, at which the outside reflecting film 45b is terminated.

In the present embodiment, the distance D12 between the first central light entrance area 40b and the light entrance area 40d is equal to the width D13 of the light entrance area 40d. The distance D12 is the distance between the position in the first light incidence surface 41a at which the center side reflecting film 45a is terminated and the position in the first light incidence surface 41a at which the outside polarization separation film 43b is terminated.

In the present embodiment, the outside polarization separation film 43b is disposed so as to be tilted 45° with respect to the first light incidence surface 41a, and when viewed along the Y-axis direction, the position in the first light exit surface 41b to which the outside polarization separation film 43b is connected overlaps the position in the first light incidence surface 41a to which the outside reflecting film 45b is connected. Therefore, the width D13 of the light entrance area 40d is equal to the thickness (the dimension along the Y-axis direction) of the first optical block 41. Further, therefore, the width D11a of the first central light entrance area 40b is smaller than the thickness of the first optical block 41.

As shown in FIG. 3, in the present embodiment, the distance D14 between the center side polarization separation film 43a and the center side reflecting film 45a is equal to the distance D16 between the outside polarization separation film 43b and the outside reflecting film 45b. The distance D15 between the center side reflecting film 45a and the outside polarization separation film 43b is equal to the distance D14.

Second Optical Block

As shown in FIGS. 2 and 3, the second optical block 42 has a rectangular solid shape in the present embodiment. Similarly to the first optical block 41, the second optical block 42 is formed of, for example, glass.

The second optical block 42 is provided with a second light incidence surface 42a, a second light exit surface 42b, a second bonding surface 42c, at least one polarization separation film, and at least one reflecting film. The reflecting film is not particularly limited as long as the reflecting film is a member capable of reflecting the light input from the polarization separation film, and a metal film, a dielectric multilayer film, and so on can be used.

In the present embodiment, the second optical block 42 includes a center side polarization separation film 44a, an outside polarization separation film 44b, a center side reflecting film 46a, and an outside reflecting film 46b. The center side polarization separation film 44a, the outside polarization separation film 44b, the center side reflecting film 46a, and the outside reflecting film 46b are each a member having a belt-like shape extending in the Z-axis direction, and are disposed inside the second optical block 42. Hereinafter, the explanation will be presented mainly using X-Y cross-sectional views.

The second bonding surface 42c corresponds to a second surface in the appended claims. The center side polarization separation film 44a corresponds to a second polarization separation film in the appended claims. The outside polarization separation film 44b corresponds to a fourth polarization separation film in the appended claims. The center side reflecting film 46a corresponds to a second reflecting film in the appended claims. The outside reflecting film 46b corresponds to a fourth reflecting film in the appended claims.

The second light incidence surface 42a is a surface of the second optical block 42 located on the side (−Y side) to which the light is input. The second light incidence surface 42a is smoothly connected to the first light incidence surface 41a of the first optical block 41.

The second light exit surface 42b is a surface opposed to the second light incidence surface 42a, and is a surface of the second optical block 42 located on the side (+Y side) from which the light is emitted. The second light exit surface 42b is smoothly connected to the first light exit surface 41b.

The second bonding surface 42c is a surface on the side (+X side) opposed to the first bonding surface 41c, and bonded to the first optical block 41. In the present embodiment, the second bonding surface 42c is perpendicular to the second light incidence surface 42a and the second light exit surface 42b.

The center side polarization separation film 44a is disposed so as to be tilted 45° with respect to the second light incidence surface 42a. One end of the center side polarization separation film 44a is connected to the second light exit surface 42b. The other end of the center side polarization separation film 44a is connected to the second bonding surface 42c. The position at which the center side polarization separation film 44a is connected to the second bonding surface 42c is a position apart from the second light incidence surface 42a by a distance D17. In other words, the center side polarization separation film 44a is terminated at the position in the second bonding surface 42c separate from the second light incidence surface 42a. The center side polarization separation film 44a has substantially the same optical characteristics as those of the center side polarization separation film 43a of the first optical block 41.

In the present embodiment, the distance between the position in the second bonding surface 42c to which the center side polarization separation film 44a is connected and the second light incidence surface 42a is equal to the distance between the position in the first bonding surface 41c to which the center side polarization separation film 43a is connected and the first light incidence surface 41a. Therefore, the center side polarization separation film 44a is connected to the center side polarization separation film 43a by the first bonding surface 41c and the second bonding surface 42c being bonded to each other so as to face each other.

Here, in the present specification, the description that the center side polarization separation film 43a and the center side polarization separation film 44a are connected to each other includes the state that the position in the first bonding surface 41c to which the center side polarization separation film 43a is connected and the position in the second bonding surface 42c to which the center side polarization separation film 44a is connected coincide with each other in the thickness direction (Y-axis direction) of the polarization conversion element 40. Further, the description that the center side polarization separation film 43a and the center side polarization separation film 44a are connected to each other includes, for example, the state in which the center side polarization separation film 43a and the center side polarization separation film 44a are connected via an adhesive for bonding the first bonding surface 41c and the second bonding surface 42c to each other.

In the present embodiment, the outside polarization separation film 44b is disposed in parallel to the center side polarization separation film 44a. Both ends of the outside polarization separation film 44b are respectively connected to the second light exit surface 42b and the second light incidence surface 42a. In other words, the outside polarization separation film 44b is terminated in the second light incidence surface 42a. The outside polarization separation film 44b is disposed on an opposite side (−X side) of the center side polarization separation film 44a to the second bonding surface 42c. The outside polarization separation film 44b has substantially the same optical characteristics as those of the center side polarization separation film 43a of the first optical block 41.

The center side reflecting film 46a is disposed between the center side polarization separation film 44a and the outside polarization separation film 44b. The outside reflecting film 46b is disposed on an opposite side (−X side) of the outside polarization separation film 44b to the center side reflecting film 46a. The center side reflecting film 46a and the outside reflecting film 46b are disposed in parallel to the center side polarization separation film 44a and the outside polarization separation film 44b. Both ends of the center side reflecting film 46a are respectively connected to the second light exit surface 42b and the second light incidence surface 42a. Both ends of the outside reflecting film 46b are respectively connected to the second light exit surface 42b and the second light incidence surface 42a. In other words, the center side reflecting film 46a and the outside reflecting film 46b are terminated in the second light incidence surface 42a. The center side reflecting film 46a and the outside reflecting film 46b are formed of, for example, metal similar to the center side reflecting film 45a of the first optical block 41.

As shown in FIGS. 2 and 3, between the second bonding surface 42c and the center side reflecting film 46a in the second light incidence surface 42a, there is formed a second central light entrance area 40c. Between the outside polarization separation film 44b and the outside reflecting film 46b in the second light incidence surface 42a, there is formed a light entrance area 40e. In the present embodiment, the width D11b of the second central light entrance area 40c is equal to the width D11a of the first central light entrance area 40b in the first optical block 41.

The first central light entrance area 40b in the first optical block 41 is connected to the second central light entrance area 40c in the second optical block 42 to form the central light entrance area 40a. The width D11 of the central light entrance area 40a is smaller than double of the width D13 of the light entrance area 40d since the width D11a of the first central light entrance area 40b and the width D11b of the second central light entrance area 40c are each smaller than the width D13 of the light entrance area 40d.

In the present embodiment, the first optical block 41 and the second optical block 42 are disposed symmetrically to each other with respect to the boundary between the first bonding surface 41c and the second bonding surface 42c. In other words, in the present embodiment, the center side polarization separation film 44a, the outside polarization separation film 44b, the enter side reflecting film 46a, and the outside reflecting film 46b are disposed symmetrically to the center side polarization separation film 43a, the outside polarization separation film 43b, the center side reflecting film 45a, and the outside reflecting film 45b, respectively, with respect to the boundary between the first bonding surface 41c and the second bonding surface 42c. Therefore, the positional relationship between the optical elements included in the second optical block 42 is the same as the relationship between the positions of the optical elements in the first optical block 41 described above.

Wave Plates

As shown in FIG. 3, the wave plate 47a is disposed between the center side polarization separation film 43a and the center side reflecting film 45a on the first light exit surface 41b of the first optical block 41. The wave plate 47b is disposed between the outside polarization separation film 43b and the outside reflecting film 45b on the first light exit surface 41b. The wave plate 48a is disposed between the center side polarization separation film 44a and the center side reflecting film 46a on the second light exit surface 42b of the second optical block 42. The wave plate 48b is disposed between the outside polarization separation film 44b and the outside reflecting film 46b on the second light exit surface 42b.

The wave plate 47a is, for example, a λ/2 plate. The wave plate 47a shifts the phase difference of the light having passed through the wave plate 47a by half wave length to change the polarization direction of the light. Specifically, the S-polarized light having entered the wave plate 47a is emitted as P-polarized light, and the P-polarized light having entered the wave plate 47a is emitted as S-polarized light. The wave plate 47b, the wave plate 48a, and the wave plate 48b each have substantially the same optical characteristics as those of the wave plate 47a.

Figure 4:
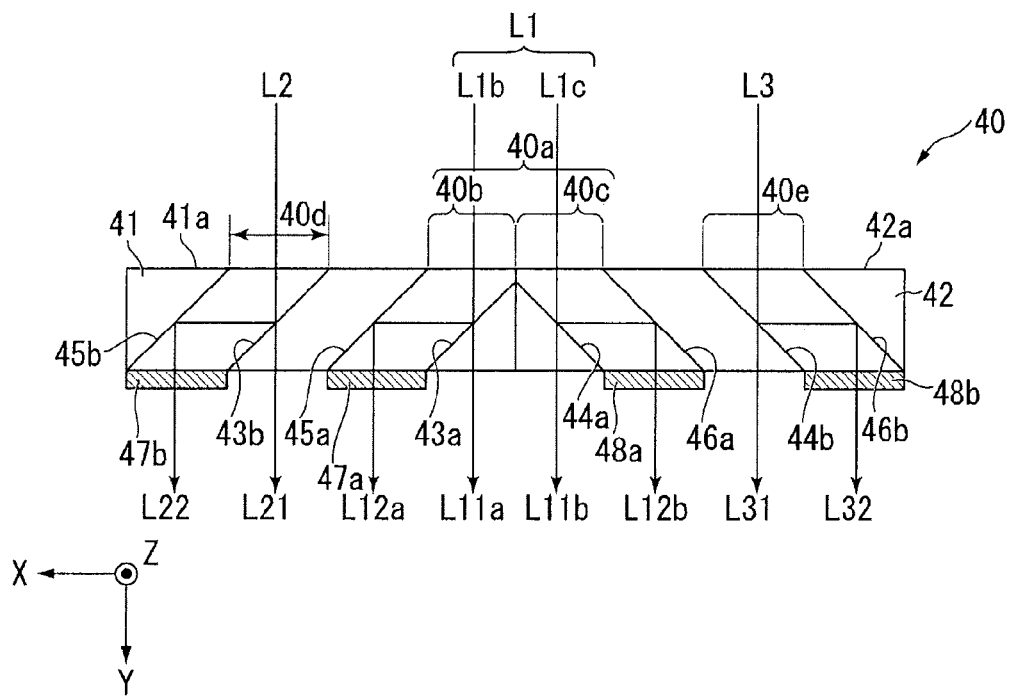
FIG. 4 is a diagram showing the case of making the light enter the polarization conversion element according to the first embodiment.

FIG. 4 is a cross-sectional view showing how the light having entered the polarization conversion element 40 proceeds. FIG. 4 shows light beams L1, L2, and L3 as the light beams entering the polarization conversion element 40. The light beam L1 is the light beam entering the central light entrance area 40a. The light beam L2 is the light beam entering the light entrance area 40d of the first optical block 41. The light beam L3 is the light beam entering the light entrance area 40e of the second optical block 42.

In the present embodiment, the light beam L1 is the light beam entering the polarization conversion element 40 through the lenses 33 in the three lens columns located in the central portion of the first lens array 31 shown in FIG. 1 via the second lens array 32. The light beam L2 is the light beam entering the polarization conversion element 40 through the lenses 33 in the lens column located in one end of the first lens array 31 via the second lens array 32. The light beam L3 is the light beam entering the polarization conversion element 40 through the lenses 33 in the lens column located in the other end of the first lens array 31 via the second lens array 32.

As shown in FIG. 4, out of the light beam L1 having entered the central light entrance area 40a, the light beam having entered the first central light entrance area 40b is defined as light beam L1b. The light beam L1b enters the center side polarization separation film 43a. The P-polarized component out of the light beam L1b transmits the center side polarization separation film 43a, and is then emitted from the first light exit surface 41b as light beam L11a. The S-polarized component out of the light beam L1b is reflected by the center side polarization separation film 43a so as to be folded 90° toward the center side reflecting film 45a, and then enters the center side reflecting film 45a. The S-polarized component having entered the center side reflecting film 45a is folded 90° again, and then enters the wave plate 47a via the first light exit surface 41b. The S-polarized component having entered the wave plate 47a is converted into the P-polarized component, and is then emitted as the light beam L12a in the same direction (the Y-axis direction) as the direction of the light beam L1a.

Out of the light beam L1, the light beam having entered the second central light entrance area 40c is defined as the light beam L1c. The light beam L1c enters the center side polarization separation film 44a, and is then emitted as the light beams L11b and L12b, which are P-polarized light, in the same direction (the Y-axis direction) from the polarization conversion element 40 in the same manner as described above. In a similar manner, the light beam L2 is also emitted from the polarization conversion element 40 as light beams L21 and L22, which are P-polarized light. In a similar manner, the light beam L3 is also emitted from the polarization conversion element 40 as light beams L31 and L32, which are P-polarized light.

Due to the process described above, the light having entered the polarization conversion element 40 is emitted after being converted into the P-polarized light.

According to the present embodiment, since the center side polarization separation film 43a is terminated at the position on the first bonding surface 41c separate from the first light incidence surface 41a, the light efficiency can be inhibited from degrading. The detailed explanation will hereinafter be presented.

Figure 10:
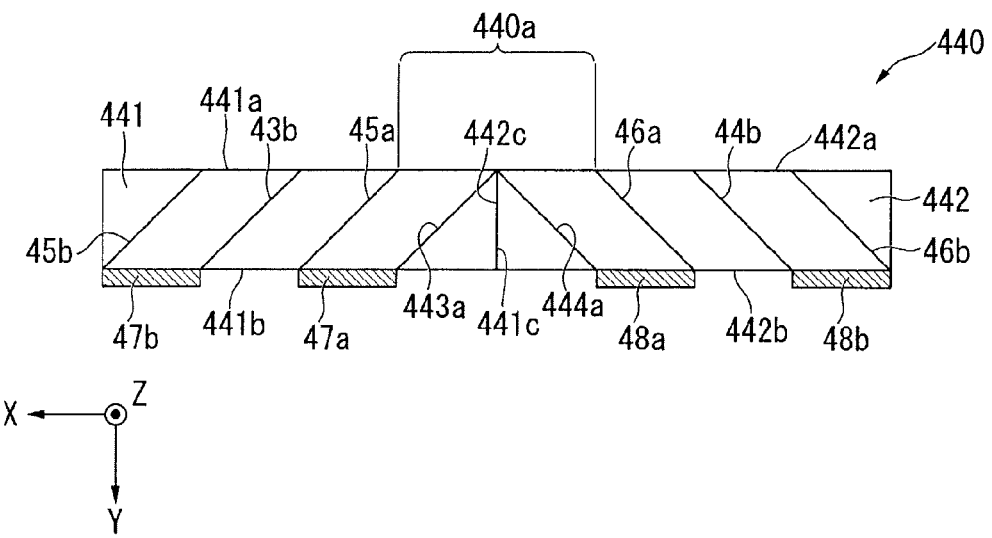
FIG. 10 is a cross-sectional view showing a polarization conversion element according to a comparative example.
Figure 11:
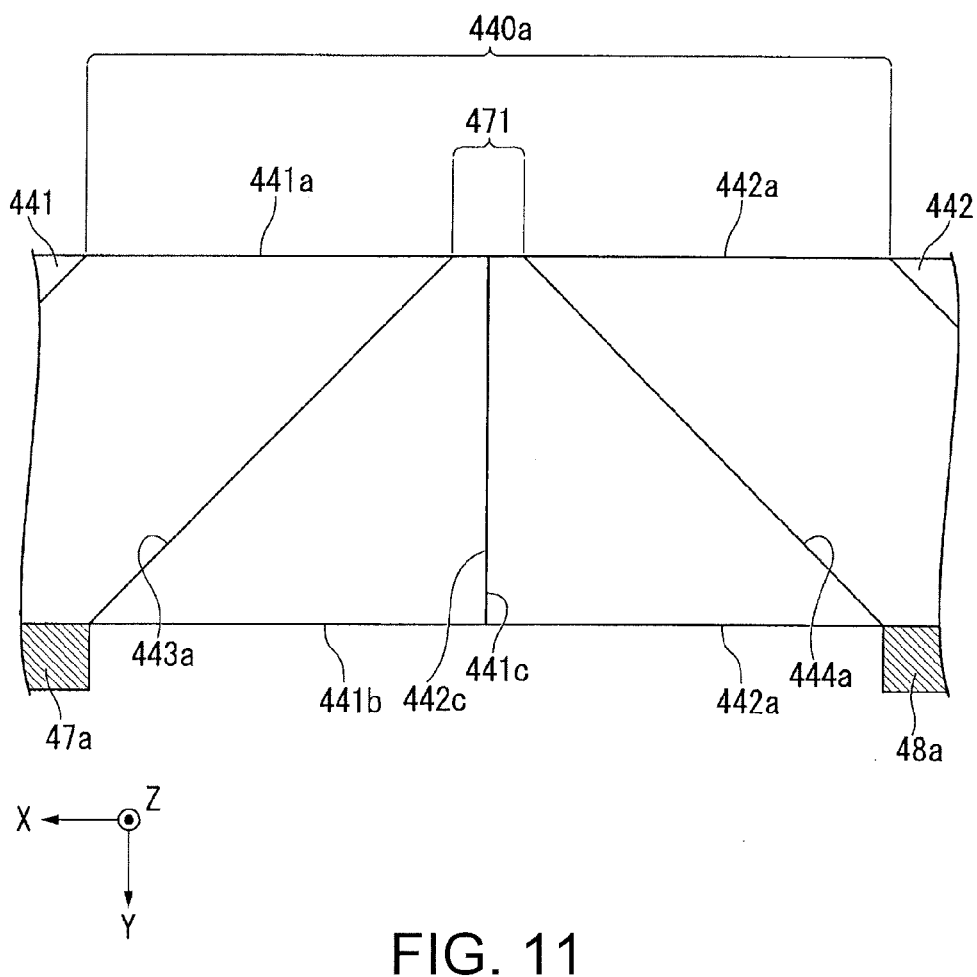
FIG. 11 is a partial enlarged cross-sectional view showing the polarization conversion element according to the comparative example.

FIG. 10 is a cross-sectional view showing a polarization conversion element 440 according to a comparative example. FIG. 11 is a partial enlarged view showing the polarization conversion element 440.

It should be noted that in the following explanation, the constituents substantially the same as those of the embodiment described above are arbitrarily denoted by the same reference symbols, and the explanation thereof will be omitted in some cases.

As shown in FIG. 10, the polarization conversion element 440 is provided with a first optical block 441 and a second optical block 442.

The first optical block 441 includes a first light incidence surface 441a, a first light exit surface 441b, a first bonding surface 441c, and a center side polarization separation film 443a.

The second optical block 442 includes a second light incidence surface 442a, a second light exit surface 442b, a second bonding surface 442c, and a center side polarization separation film 444a.

The first optical block 441 and the second optical block 442 are bonded to each other so that the first bonding surface 441c and the second bonding surface 442c are opposed to each other. Between the position in the first light incidence surface 441a to which the center side reflecting film 45a is connected, and the position in the second light incidence surface 442a to which the center side reflecting film 46a is connected, there is formed a central light entrance area 440a.

In the polarization conversion element 440, the center side polarization separation film 443a is designed so as to be connected to an intersection between the first light incidence surface 441a and the first bonding surface 441c, and the center side polarization separation film 444a is designed so as to be connected to an intersection between the second light incidence surface 442a and the second bonding surface 442c.

Here, in the polarization conversion element 440 according to the comparative example, as shown in FIG. 11, due to manufacturing variations, the center side polarization separation film 443a is connected to a position in the first light incidence surface 441a separate from the first bonding surface 441c in some cases, and the center side polarization separation film 444a is connected to a position in the second light incidence surface 442a separate from the second bonding surface 442c in some cases. It should be noted that in FIG. 11, the center side polarization separation film 443a is connected to a position in the first light incidence surface 441a separate from the first bonding surface 441c, and the center side polarization separation film 444a is connected to a position in the second light incidence surface 442a separate from the second bonding surface 442c.

In such a case, a gap 471 is formed in an area between the center side polarization separation film 443a and the center side polarization separation film 444a, namely a central portion of the central light entrance area 440a. Therefore, the light passing through the gap 471 out of the light having entered the central light entrance area 440a fails to enter the polarization separation film, but is emitted from the first light exit surface 441b or the second light exit surface 442b, and therefore, is not subject to the polarization conversion. Therefore, the polarization conversion efficiency of the polarization separation element 440 has degraded in some cases.

In contrast, according to the present embodiment, the center side polarization separation film 43a is connected to the position in the first bonding surface 41c separate from the first light incidence surface 41a, and the center side polarization separation film 44a is connected to the position in the second bonding surface 42c separate from the second light incidence surface 42a. Therefore, even in the case in which the manufacturing variations has occurred, the center side polarization separation film 43a is inhibited from being connected to the position in the first light incidence surface 41a separate from the first bonding surface 41c, or the center side polarization separation film 44a is inhibited from being connected to the position in the second light incidence surface 42a separate from the second bonding surface 42c, and thus, it is difficult for the gap to be generated in the central light entrance area 40a. Therefore, according to the present embodiment, the component not subject to the polarization conversion out of the light entering the central light entrance area 40*a* of the polarization conversion element 40 can be reduced, and as a result, the polarization conversion efficiency of the polarization conversion element 40 can be inhibited from degrading.

Further, in the present embodiment, the light beam L1, which has been collected by the lenses in the three lens columns located in the central portion out of the lenses 33 of the first lens array 31, enters the central light entrance area 40*a*. Therefore, the light from the lenses 33 in the lens column located in the central portion enters the central portion of the central light entrance area 40*a*. In the present embodiment, as described above, the gap can be prevented from being generated in the central portion of the central light entrance area 40*a*, or the gap generated in the central portion of the central light entrance area 40*a* can be made smaller. Therefore, a particularly high advantage can be obtained in the configuration in which the light enters the central light entrance area 40*a* from the three lens columns located in the central portion of the first lens array 31. In other words, a particularly high advantage can be obtained in the configuration in which the light emitted from one of the lenses 33 enters both of the first central light entrance area 40*b* and the second central light entrance area 40*c*.

Further, according to the present embodiment, the width D11*a* of the first central light entrance area 40*b* is smaller than the width D13 of the light entrance area 40*d*. Therefore, as in the case of the present embodiment, the distance D14 between the center side polarization separation film 43*a* and the center side reflecting film 45*a* and the distance D16 between the outside polarization separation film 43*b* and the outside reflecting film 45*b* can be made equal to each other.

As an example of the manufacturing method of the polarization conversion element 40, there can be cited a method of manufacturing the polarization conversion element 40 by stacking a plurality of substrates made of glass or the like so as to alternately sandwiching the reflecting film and the polarization separation film therebetween to form a laminated body, and then cutting the laminated body obliquely to the principal surface of the substrates. In the case of using such a manufacturing method, the distance D14 between the center side polarization separation film 43*a* and the center side reflecting film 45*a* and the distance D16 between the outside polarization separation film 43*b* and the outside reflecting film 45*b* correspond to the thicknesses of the substrates stacked, respectively. Therefore, since the distance D14 and the distance D16 can be made equal to each other, the substrates having the same thickness can be used as the plurality of substrates to be stacked. Therefore, according to the present embodiment, in the case of using such a manufacturing method as described above, the manufacturing cost of the polarization conversion element 40 can be reduced.

Further, according to the present embodiment, the distance D15 between the center side reflecting film 45*a* and the outside polarization separation film 43*a* is equal to the distance D14 between the center side polarization separation film 43*a* and the center side reflecting film 45*a*. Therefore, in the case of using such a manufacturing method as described above, the manufacturing cost can further be reduced.

Further, according to the present embodiment, the first optical block 41 and the second optical block 42 are disposed symmetrically to each other with respect to the boundary between the first bonding surface 41*c* and the second bonding surface 42*c*. Therefore, a symmetric property of the light emitted from the polarization conversion element 40 can be improved.

Further, according to the projector 1 of the present embodiment, since the polarization conversion element 40 capable of inhibiting the polarization conversion element from degrading is provided, the light efficiency can be inhibited from degrading.

It should be noted that in the present embodiment, it is also possible to adopt the following configurations.

In the present embodiment, the position at which the center side polarization separation film 43*a* is terminated in the first bonding surface 41*c* of the first optical block 41 and the position at which the center side polarization separation film 44*a* is terminated in the second bonding surface 42*c* of the second optical block 42 can be shifted in the thickness direction from each other. In other words, the center side polarization separation film 43*a* and the center side polarization separation film 44*a* are not required to be connected to each other.

Further, in the present embodiment, the center side polarization separation film 44*a* of the second optical block 42 can also be connected to the second light incidence surface 42*a*.

Further, although in the explanation described above, there is adopted the configuration in which the light having been emitted from the three lens columns enters the central light entrance area 40*a*, the invention is not limited to this configuration. In the present embodiment, it is also possible, for example, for the light having been emitted from one lens column to enter the central light entrance area 40*a*, or for the light having been emitted from an odd number equal to or greater than five of lens columns to enter the central light entrance area 40*a*.

Second Embodiment

The second embodiment is different from the first embodiment in the point that the distance between the center side polarization separation film and the center side reflecting film is longer than the distance between the outside polarization separation film and the outside reflecting film.

It should be noted that in the following explanation, the constituents substantially the same as those of the embodiment described above are arbitrarily denoted by the same reference symbols, for example, to thereby omit the explanation thereof in some cases.

Figure 5:
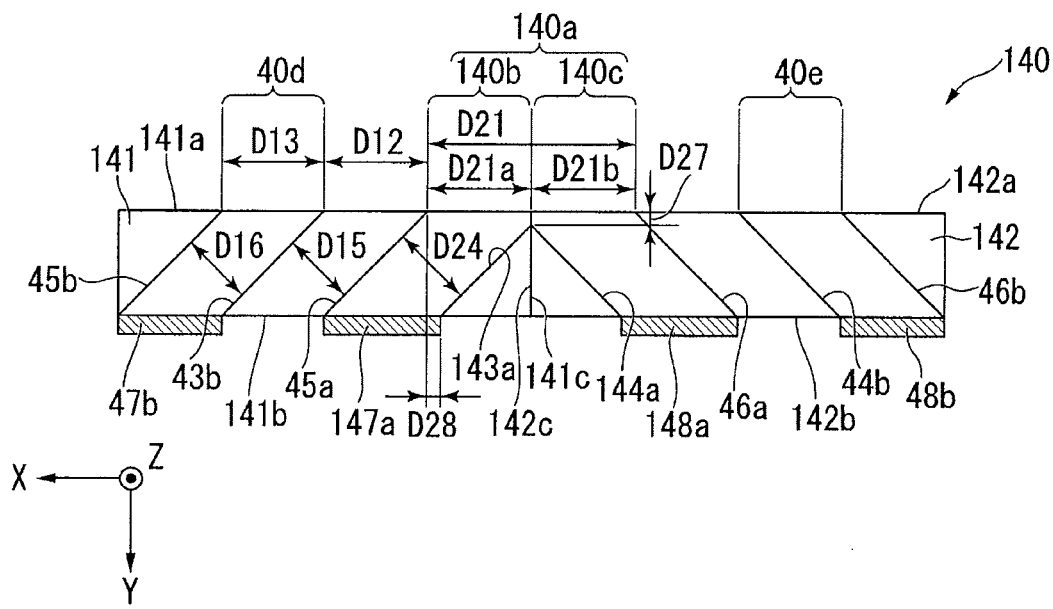
FIG. 5 is a cross-sectional view showing a polarization conversion element according to a second embodiment of the invention.

FIG. 5 is a cross-sectional view showing a polarization conversion element 140 according to the present embodiment.

As shown in FIG. 5, the polarization conversion element 140 according to the present embodiment is provided with a first optical block 141, a second optical block 142, a wave plate 147*a*, and a wave plate 148*a*.

The wave plate 147*a* and the wave plate 148*a* are substantially the same as the wave plate 47*a* and the wave plate 48*a*, respectively, in the first embodiment.

The first optical block 141 includes a first light incidence surface 141*a*, a first light exit surface 141*b*, a first bonding surface 141*c*, and a center side polarization separation film 143*a*.

The first bonding surface 141*c* corresponds to the first surface in the appended claims. The center side polarization separation film 143*a* corresponds to the first polarization separation film in the appended claims.

The second optical block 142 includes a second light incidence surface 142a, a second light exit surface 142b, a second bonding surface 142c, and a center side polarization separation film 144a.

The second bonding surface 142c corresponds to the second surface in the appended claims. The center side polarization separation film 144a corresponds to the second polarization separation film in the appended claims.

The first light incidence surface 141a is substantially the same as the first light incidence surface 41a according to the first embodiment. The first light exit surface 141b is substantially the same as the first light exit surface 41b according to the first embodiment. The first bonding surface 141c is substantially the same as the first bonding surface 41c according to the first embodiment.

The second light incidence surface 142a is substantially the same as the second light incidence surface 42a according to the first embodiment. The second light exit surface 142b is substantially the same as the second light exit surface 42b according to the first embodiment. The second bonding surface 142c is substantially the same as the second bonding surface 42c according to the first embodiment.

The center side polarization separation film 143a and the center side polarization separation film 144a are disposed in a similar manner to the center side polarization separation film 43a and the center side polarization separation film 44a according to the first embodiment. The termination positions in the first bonding surface 141c and the second bonding surface 142c are positions apart from the first light incidence surface 141a and the second light incidence surface 142a by the distance D27, respectively.

The first optical block 141 and the second optical block 142 are bonded to each other so that the first bonding surface 141c and the second bonding surface 142c are opposed to each other similarly to the first embodiment. The first optical block 141 and the second optical block 142 are disposed symmetrically to each other with respect to the boundary between the first bonding surface 141c and the second bonding surface 142c. Therefore, in the following explanation, the first optical block 141 will be explained alone as a representative in some cases.

Between the first bonding surface 141c and the center side reflecting film 45a in the first light incidence surface 141a, there is formed a first central light entrance area 140b. In the present embodiment, the width D21a of the first central light entrance area 140b is equal to the width D13 of the light entrance area 40d. In other words, the distance between the position in the first light incidence surface 141a, at which the center side reflecting film 45a is terminated, and the first bonding surface 141c is equal to the distance between the position in the first light incidence surface 141a, at which the outside polarization separation film 43b is terminated, and the position in the first light incidence surface 141a, at which the outside reflecting film 45b is terminated.

In the present embodiment, the distance between the position in the first light incidence surface 141a at which the outside reflecting film 45b is terminated and the outside (+X side) end portion of the first light incidence surface 141a is equal to the width D21a of the first central light entrance area 140b. In the present embodiment, the center side reflecting film 45a, the outside polarization separation film 43b, and the outside reflecting film 45b are connected to the first light incidence surface 141a so as to divide the first light incidence surface 141a into quarters in the width direction (the X-axis direction).

Between the second bonding surface 142c and the center side reflecting film 46a in the second light incidence surface 142a, there is formed a second central light entrance area 140c. The width D21b of the second central light entrance area 140c is equal to the width D21a of the first central light entrance area 140b. Therefore, the width D21 of the central light entrance area 140a formed of the first central light entrance area 140b and the second central light entrance area 140c is twice as large as the width D13 of the light entrance area 40d.

In the present embodiment, the distance D24 between the center side polarization separation film 143a and the center side reflecting film 45a is longer than the distance D16 between the outside polarization separation film 43b and the outside reflecting film 45b.

The position in the first light exit surface 141b to which the center side polarization separation film 143a is connected and the position in the first light incidence surface 141a to which the center side reflecting film 45a is connected are distant as much as a distant D28 from each other in the width direction (the X-axis direction) of the polarization conversion element 140. In the present embodiment, the distance D28 is designed so that the whole light entering the first central light entrance area 140b from the first lens array 31 enters the center side polarization separation film 143a. The detailed explanation will hereinafter be presented.

Figure 6:
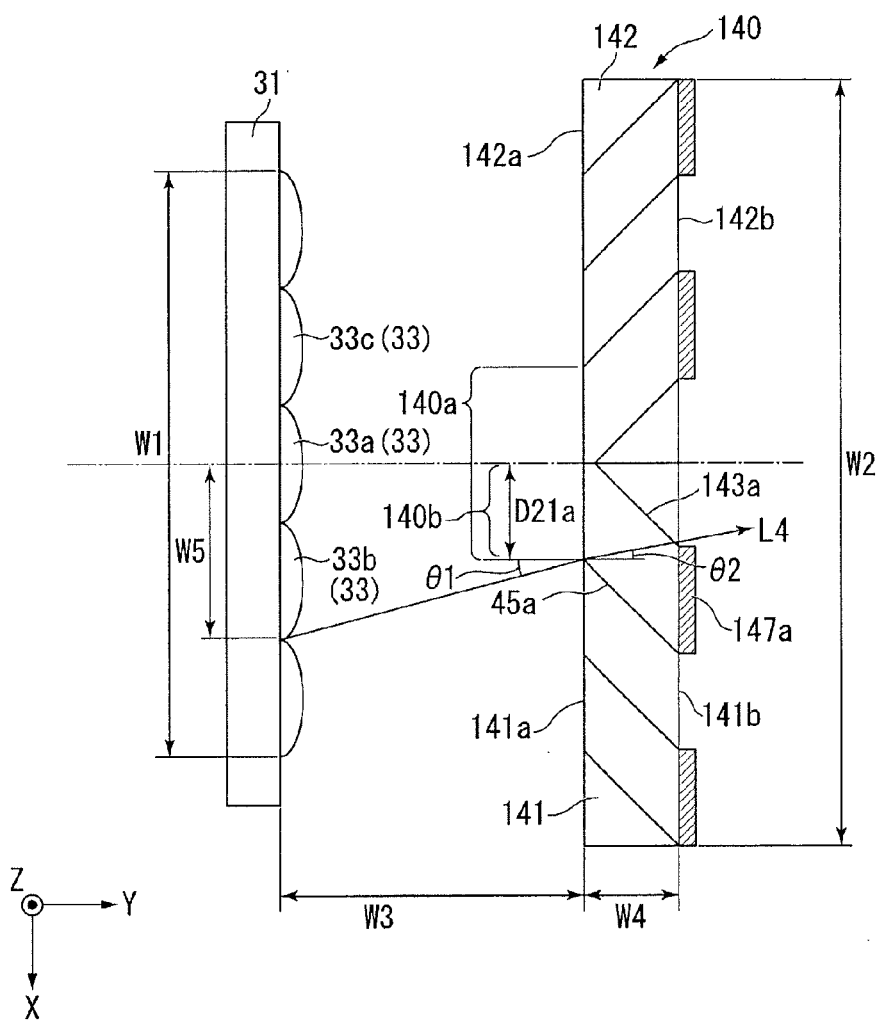
FIG. 6 is a diagram showing the polarization conversion element and a first lens array according to the second embodiment.
Figure 7:
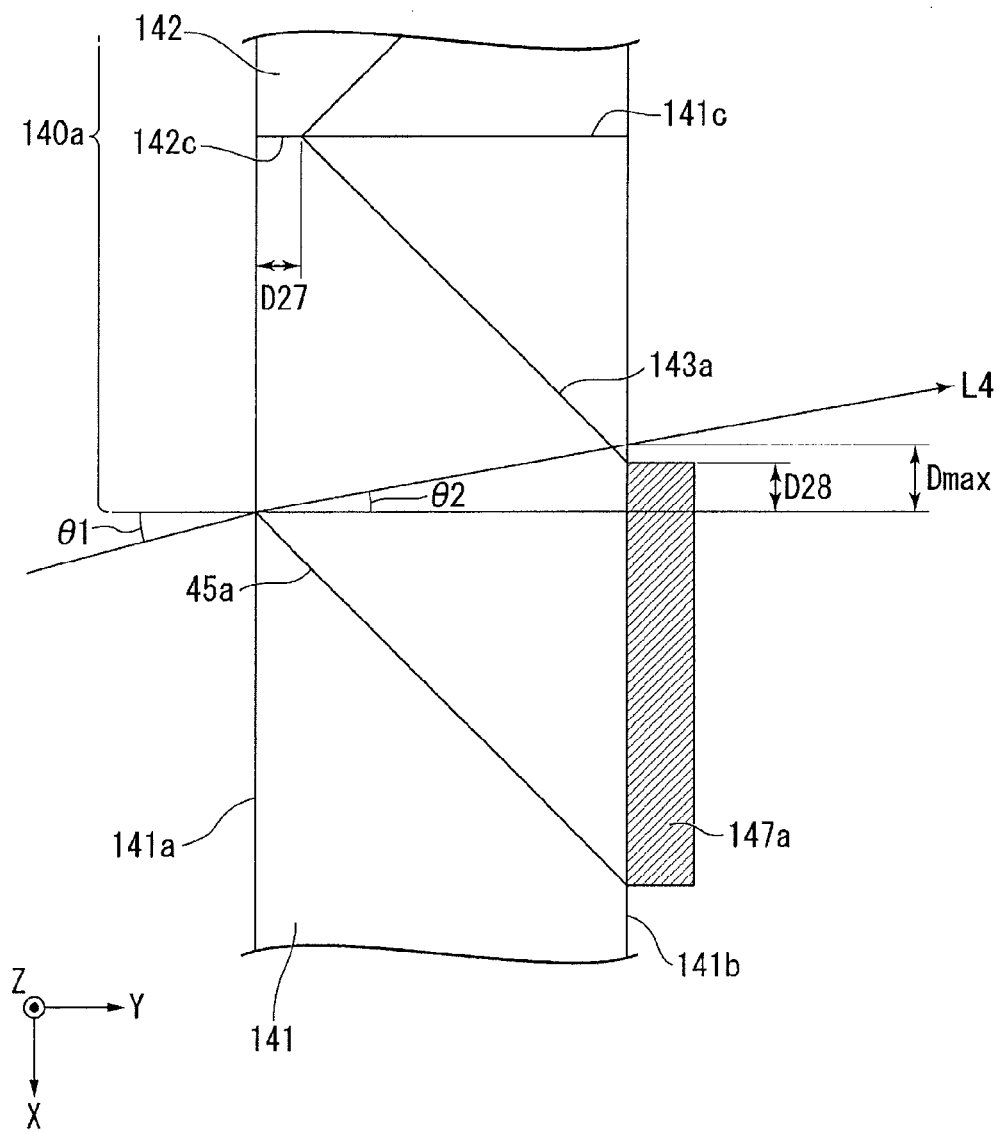
FIG. 7 is a partial enlarged view of FIG. 6.

FIG. 6 is a diagram showing the polarization conversion element 140 and the first lens array 31. FIG. 7 is a partial enlarged view of FIG. 6. Since the second lens array 32 has a little influence on the intensity distribution of the light in the polarization conversion element 140, graphical description of the second lens array 32 is omitted in FIGS. 6 and 7.

As shown in FIG. 6, in the present embodiment, the light, which has been emitted from the lenses 33a in the lens columns located in the central portion of the first lens array 31 and the lenses 33b and the lenses 33c in the lens columns on both adjacent sides of the lenses 33a, enters the central light entrance area 140a. The distance D28 is designed so that the light beam L4 shown in FIGS. 6 and 7 enters the center side polarization separation film 143a.

The light beam L4 is a light beam emitted from the outside (+X side) end portion of the lenses 33b and then entering the outside (+X side) end portion of the central light entrance area 140a, namely the outside (+X side) end portion of the first central light entrance area 140b. In the case in which the light beam L4 enters the center side polarization separation film 143a, all of the light beams entering the first central light entrance area 140b from the lenses 33a, the lenses 33b, and the lenses 33c enter the center side polarization separation film 143a.

The angle θ1 at which the light beam L4 enters the central light entrance area 140a can be expressed as (Formula 1) and (Formula 2) below.

$$\theta 1 = a\tan((W5-D21a)/W3) \quad \text{(Formula 1)}$$

$$W5 = 1.5 \cdot W1/N \quad \text{(Formula 2)}$$

The symbol W1 denotes the width (the dimension in the X-axis direction) of all of the lenses 33 in the first lens array 31. The symbol W3 denotes the distance between the lenses 33 and the polarization conversion element 140. The symbol W5 denotes the distance from the outside (+X side) end portion of the lens 33b to the optical axis of the lens 33a. The symbol N denotes the number of the lens columns, and is 5 in the present embodiment. In the present embodiment, since the optical axis of the lens 33a passes through the bonding interface between the first optical block 141 and the second optical block 142, the distance W5 becomes 1.5 as large as the width of the lens 33.

Further, in the present embodiment, since the first light incidence surface 141a is divided into quarters as described above, the width D21a of the first central light entrance area 140b can be expressed as (Formula 3) below.

$$D21a = W2/(2 \cdot (N-1))$$ (Formula 3)

The symbol W2 denotes the width (the dimension in the X-axis direction) of the polarization conversion element 140.

When the light beam L4 enters the first optical block 141 with the angle θ1, the light beam L4 is refracted, and then proceeds in the first optical block 141 with an angle θ2. The angle θ2 of the light beam L4 having been refracted can be expressed as (Formula 4) below.

$$\theta 2 = a \sin(\sin \theta 1/n)$$ (Formula 4)

The symbol n denotes the relative refractive index of the first optical block 141 in the polarization conversion element 140 with respect to air.

As shown in FIG. 7, the light beam L4 having proceeded through the first optical block 141 with the angle θ2 is emitted from the first light exit surface 141b. The distance Dmax in the width direction (the X-axis direction) between the incident position of the light beam L4 in the first light incidence surface 141a and the exit position of the light beam L4 in the first light exit surface 141b can be expressed as (Formula 5) below.

$$D\max = W4 \cdot \tan \theta 2$$ (Formula 5)

The symbol W4 denotes the thickness (the dimension in the Y-axis direction) of the polarization conversion element 140, namely the first optical block 141.

In the present embodiment, the distance D28 is set so as to be equal to or shorter than the distance Dmax. Since the distance D28 is designed as described above, the whole light entering the first central light entrance area 140b of the central light entrance area 140a from the first lens array 31 enters the center side polarization separation film 143a.

Here, in the present embodiment, the width D21a of the first central light entrance area 140b is equal to the width D13 of the light entrance area 40d, and the width D13 of the light entrance area 40d is equal to the thickness (the dimension in the Y-axis direction) of the first optical block 41 as described in the description of the first embodiment. Thus, the width D21a of the first central light entrance area 140b is equal to the thickness of the first optical block 41. Further, the center side polarization separation film 143a is tilted 45° with respect to the first light incidence surface 141a. Therefore, in the present embodiment, the distance D28 is equal to the distance D27. Therefore, in the present embodiment, the distance D27 between the position in the first bonding surface 141c at which the center side polarization separation film 143a is terminated and the first light incidence surface 141a is set to be equal to or shorter than the distance Dmax.

According to the present embodiment, similarly to the first embodiment, the polarization conversion efficiency of the polarization conversion element can be inhibited from degrading.

Further, according to the present embodiment, since the distance D24 between the center side polarization separation film 143a and the center side reflecting film 45a is longer than the distance D16 between the outside polarization separation film 43b and the outside reflecting film 45b, the width D21a of the first central light entrance area 140b and the width D13 of the light entrance area 40d can be set to be equal to each other as in the present embodiment. Thus, it is possible to save the trouble of designing the angle of the light, which enters the polarization conversion element 140 through the integrator optical system 30, in accordance with the corresponding light entrance area.

Further, in the case in which the width of the light entrance area is narrow, it is necessary to increase the angle of the light using the integrator optical system 30. Therefore, it is easy for the light with a large angle to enter the polarization conversion element, and there is a possibility that the light having been emitted from the polarization conversion element is blocked by other optical members, and thus, the light efficiency of the projector degrades.

In contrast, according to the present embodiment, since the width D21a of the first central light entrance area 140b can be made equal to the width D13 of the light entrance area 40d, the width D21a of the first central light entrance area 140b can be inhibited from becoming smaller than the width of other light entrance areas. Thus, according to the present embodiment, it is possible to inhibit the light efficiency of the projector from degrading while inhibiting the polarization conversion efficiency of the polarization conversion element from degrading.

Third Embodiment

The third embodiment is different from the first embodiment in the point that a reflecting element 60 is disposed between the first optical block 41 and the second optical block 42.

It should be noted that in the following explanation, the constituents substantially the same as those of the embodiment described above are arbitrarily denoted by the same reference symbols, for example, to thereby omit the explanation thereof in some cases.

Figure 8:
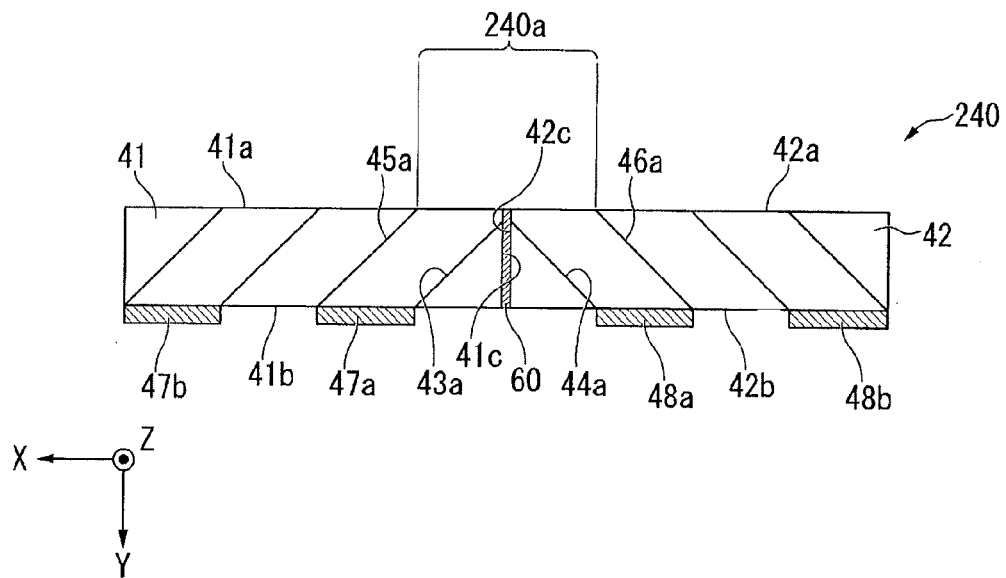
FIG. 8 is a cross-sectional view showing a polarization conversion element according to a third embodiment of the invention.

FIG. 8 is a cross-sectional view showing a polarization conversion element 240 according to the present embodiment.

As shown in FIG. 8, the polarization conversion element 240 is provided with the reflecting element 60.

The reflecting element 60 is disposed between the first bonding surface 41c of the first optical block 41 and the second bonding surface 42c of the second optical block 42. In other words, the first optical block 41 and the second optical block 42 are bonded to each other via the reflecting element 60 so that the first bonding surface 41c and the second bonding surface 42c are opposed to each other.

The reflecting element 60 is formed of, for example, metal high in light reflectance such as silver (Ag) or aluminum (Al), and reflects the light having entered the reflecting element 60.

Between the connection position of the center side reflecting film 45a in the first light incidence surface 41a and the connection position of the center side reflecting film 46a in the second light incidence surface 42a, there is formed a central light entrance area 240a.

According to the present embodiment, the polarization conversion efficiency can further be inhibited from degrading.

Figure 9:
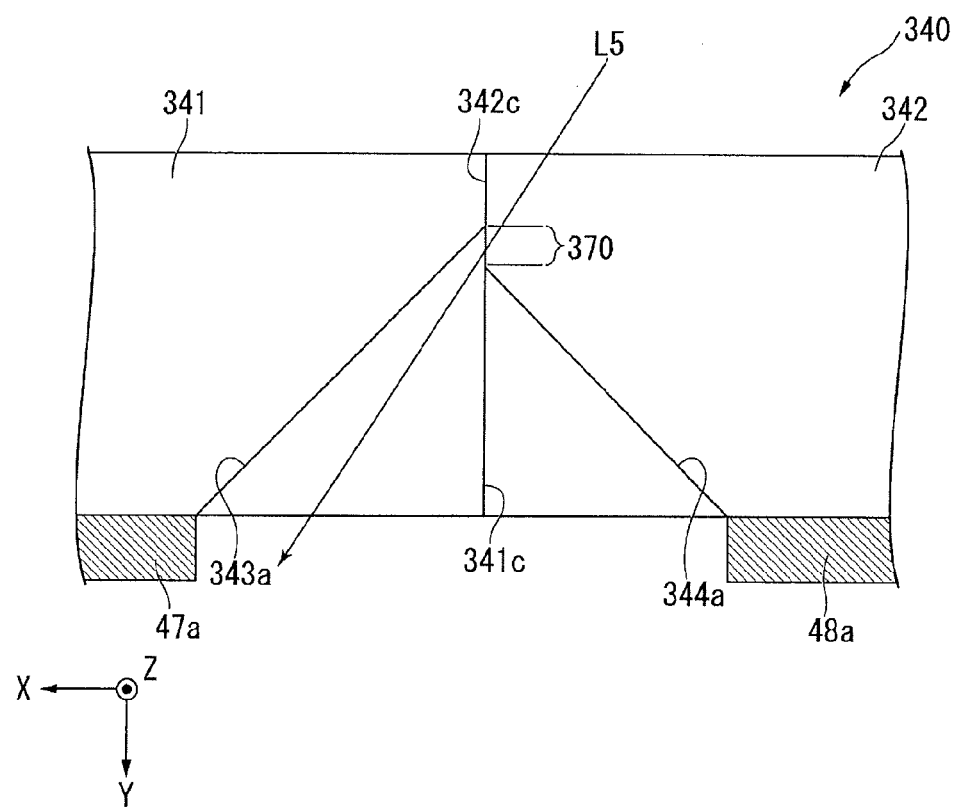
FIG. 9 is a diagram for explaining an advantage of the polarization conversion element according to the third embodiment.

FIG. 9 is a diagram for explaining an advantage of the present embodiment. The polarization conversion element 340 shown in FIG. 9 is the case in which, for example, the center side polarization separation films opposed to each other fail to be connected to each other due to the manufacturing variations in the polarization conversion element according to the first embodiment.

As shown in FIG. 9, the polarization conversion element 340 is provided with a first optical block 341 and a second optical block 342.

The first optical block 341 includes a first bonding surface 341c and a center side polarization separation film 343a.

The second optical block 342 includes a second bonding surface 342c and a center side polarization separation film 344a.

The position in the first bonding surface 341c at which the center side polarization separation film 343a is terminated and the position in the second bonding surface 342c at which the center side polarization separation film 344a is terminated are different in the thickness direction (the Y-axis direction). Therefore, there is formed a gap 370 in the boundary between the first bonding surface 341c and the second bonding surface 342c. In such a case as described above, if the light with a large angle enters the polarization conversion element 340, for example, there is a possibility that the light passes through the gap 370 as in the case of the light beam L5 shown in FIG. 9. The light beam L5 passing through the gap 370 enters neither the center side polarization separation film 343a nor the center side polarization separation film 344a, and is not subject to the polarization conversion.

In contrast, according to the present embodiment, since the reflecting element 60 is disposed between the first optical block 41 and the second optical block 42 as shown in FIG. 8, even in the case in which the gap 370 is formed due to the manufacturing variations, the light entering the gap 370 is reflected by the reflecting element 60, and easily enters the center side polarization separation film 343a or the center side polarization separation film 344a. Therefore, according to the present embodiment, the component not subject to the polarization conversion out of the light having entered the central light entrance area 240a can be reduced, and the polarization conversion efficiency can be inhibited from degrading.

It should be noted that in the embodiments explained described above, it is assumed that there is adopted the configuration in which the reflecting element 60 is disposed in the entire area between the first binding surface 41c and the second bonding surface 42c, the invention is not limited to this configuration. In the present embodiment, it is also possible to adopt the configuration in which the reflecting element 60 is disposed in a part of the area between the first bonding surface 41c and the second bonding surface 42c.

It should be noted that although it is assumed in the embodiments that there is adopted the configuration in which each of the first lens array 31 and the second lens array 32 is provided with an odd number of lens columns, namely the five lens columns, the applicable scope of the invention is not limited to this configuration. The invention can also be applied to a projector having a configuration in which the first lens array 31 and the second lens array 32 are each provided with an even number of lens columns.

The entire disclosure of Japanese Patent Application No. 2014-118784, filed on Jun. 9, 2014 is expressly incorporated by reference herein.

What is claimed is:

1. A polarization conversion element comprising:
a first optical block including a first polarization separation film, a first reflecting film, a first surface, and a first light incidence surface; and
a second optical block including a second polarization separation film, a second reflecting film, a second surface, and a second light incidence surface,
wherein the first optical block and the second optical block are bonded to each other so that the first surface and the second surface are opposed to each other,
the first polarization separation film is disposed so as to be opposed to the second polarization separation film via the first surface and the second surface, and
the first polarization separation film is terminated at a position in the first surface separate from the first light incidence surface.

2. The polarization conversion element according to claim 1, wherein
the second polarization separation film is terminated at a position in the second surface separate from the second light incidence surface.

3. The polarization conversion element according to claim 2, wherein
the first polarization separation film and the second polarization separation film are connected to each other.

4. A projector comprising:
the polarization conversion element according to claim 3;
a light source;
a lens adapted to guide light emitted from the light source to the polarization conversion element;
a light modulation element adapted to modulate light emitted from the polarization conversion element; and
a projection optical system adapted to project light modulated by the light modulation element.

5. A projector comprising:
the polarization conversion element according to claim 2;
a light source;
a lens adapted to guide light emitted from the light source to the polarization conversion element;
a light modulation element adapted to modulate light emitted from the polarization conversion element; and
a projection optical system adapted to project light modulated by the light modulation element.

6. The polarization conversion element according to claim 1, further comprising:
a reflecting element disposed between the first surface and the second surface.

7. A projector comprising:
the polarization conversion element according to claim 6;
a light source;
a lens adapted to guide light emitted from the light source to the polarization conversion element;
a light modulation element adapted to modulate light emitted from the polarization conversion element; and
a projection optical system adapted to project light modulated by the light modulation element.

8. The polarization conversion element according to claim 1, wherein
the first optical block includes a third polarization separation film and a third reflecting film,
the first reflecting film is terminated on the first light incidence surface,
the third polarization separation film and the third reflecting film are terminated on the first light incidence surface, and
a distance between a position in the first light incidence surface, at which the first reflecting film is terminated, and the first surface is shorter than a distance between a position in the first light incidence surface, at which the third polarization separation film is terminated, and a position in the first light incidence surface, at which the third reflecting film is terminated.

9. The polarization conversion element according to claim 8, wherein
the second optical block includes a fourth polarization separation film and a fourth reflecting film, the second reflecting film is terminated on the second light incidence surface, the fourth polarization separation film and the fourth reflecting film are terminated on the second light incidence surface, and a distance between a position in the second light incidence surface, at which the second reflecting film is terminated, and the second surface is shorter than a distance between a position in the second light incidence surface, at which the fourth polarization separation film is terminated, and a position in the second light incidence surface, at which the fourth reflecting film is terminated.

10. A projector comprising:

the polarization conversion element according to claim 9;

a light source;

a lens adapted to guide light emitted from the light source to the polarization conversion element;

a light modulation element adapted to modulate light emitted from the polarization conversion element; and a projection optical system adapted to project light modulated by the light modulation element.

11. A projector comprising:

the polarization conversion element according to claim 8;

a light source;

a lens adapted to guide light emitted from the light source to the polarization conversion element;

a light modulation element adapted to modulate light emitted from the polarization conversion element; and a projection optical system adapted to project light modulated by the light modulation element.

12. The polarization conversion element according to claim 1, wherein the first optical block includes a third polarization separation film and a third reflecting film, the first polarization separation film and the first reflecting film are disposed in parallel to each other, the third polarization separation film and the third reflecting film are disposed in parallel to each other, and a distance between the first polarization separation film and the first reflecting film is longer than a distance between the third polarization separation film and the third reflecting film.

13. The polarization conversion element according to claim 12, wherein the second optical block includes a fourth polarization separation film and a fourth reflecting film, the second polarization separation film and the second reflecting film are disposed in parallel to each other, the fourth polarization separation film and the fourth reflecting film are disposed in parallel to each other, and a distance between the second polarization separation film and the second reflecting film is longer than a distance between the fourth polarization separation film and the fourth reflecting film.

14. A projector comprising:

the polarization conversion element according to claim 13;

a light source;

a lens adapted to guide light emitted from the light source to the polarization conversion element;

a light modulation element adapted to modulate light emitted from the polarization conversion element; and a projection optical system adapted to project light modulated by the light modulation element.

15. A projector comprising:

the polarization conversion element according to claim 12;

a light source;

a lens adapted to guide light emitted from the light source to the polarization conversion element;

a light modulation element adapted to modulate light emitted from the polarization conversion element; and a projection optical system adapted to project light modulated by the light modulation element.

16. A projector comprising:

the polarization conversion element according to claim 1;

a light source;

a lens adapted to guide light emitted from the light source to the polarization conversion element;

a light modulation element adapted to modulate light emitted from the polarization conversion element; and a projection optical system adapted to project light modulated by the light modulation element.

* * * * *